(12) United States Patent
Middleton et al.

(10) Patent No.: US 9,073,563 B2
(45) Date of Patent: Jul. 7, 2015

(54) RECIPROCATING POWER TOOL

(75) Inventors: Scott D. Middleton, Nisku (CA); Winston Harold Parnall, Edmonton (CA); Alfred John Ogston, Calgary (CA)

(73) Assignee: Crystal Glass Canada Ltd., Edmonton (CA)

( * ) Notice: Subject to any disclaimer, the term of this patent is extended or adjusted under 35 U.S.C. 154(b) by 460 days.

(21) Appl. No.: 13/474,314

(22) Filed: May 17, 2012

(65) Prior Publication Data
US 2012/0291294 A1 Nov. 22, 2012

Related U.S. Application Data

(60) Provisional application No. 61/487,605, filed on May 18, 2011.

(51) Int. Cl.
| | |
|---|---|
| *B27B 19/04* | (2006.01) |
| *B62B 7/00* | (2006.01) |
| *B23D 51/10* | (2006.01) |
| *B23D 51/16* | (2006.01) |
| *B25F 5/02* | (2006.01) |

(52) U.S. Cl.
CPC . *B62B 7/00* (2013.01); *B23D 51/10* (2013.01); *B23D 51/16* (2013.01); *B25F 5/02* (2013.01)

(58) Field of Classification Search
USPC ........ 30/392, 394, 393, 277, 277.4; 74/25, 50
See application file for complete search history.

(56) References Cited

U.S. PATENT DOCUMENTS

| | | | | |
|---|---|---|---|---|
| 3,451,276 | A | | 6/1969 | Wadlow et al. |
| 3,457,796 | A | * | 7/1969 | De Waters et al. ............... 74/50 |
| 3,942,251 | A | * | 3/1976 | Griffies et al. ................. 30/376 |
| 4,145,811 | A | * | 3/1979 | Kendzior ....................... 30/394 |
| 4,272,996 | A | | 6/1981 | Sauerwein |
| 4,628,605 | A | | 12/1986 | Clowers |
| 4,976,164 | A | * | 12/1990 | Lentino ............................ 74/50 |
| 5,083,376 | A | * | 1/1992 | Lentino .......................... 30/392 |
| 5,099,705 | A | * | 3/1992 | Dravnieks ........................ 74/50 |
| 5,134,777 | A | | 8/1992 | Meyer et al. |
| 5,212,887 | A | | 5/1993 | Farmerie |
| 5,316,415 | A | | 5/1994 | Chiu |
| 5,479,709 | A | * | 1/1996 | Lai .............................. 30/123.3 |
| RE35,258 | E | | 6/1996 | Palm |

(Continued)

OTHER PUBLICATIONS

Search Report and Written Opinion, dated Aug. 30, 2012, corresponding to International Application No. PCT/CA/2012/000481 (filed May 17, 2012), parent of the present application, 7 pages.

*Primary Examiner* — Omar Flores Sanchez
(74) *Attorney, Agent, or Firm* — Lathrop & Gage LLP

(57) ABSTRACT

A reciprocating power tool and drive mechanism with a drive shaft mounted for reciprocating movement relative to a housing along a center longitudinal axis of the drive shaft. The drive shaft has a front end adapted to attach to an external shaft or tool attachment, a rear end, and a slot oriented perpendicular to the center longitudinal axis of the drive shaft between the front and rear ends. A motor driven shaft imparts rotary movement to a pinion gear, which meshes with a crown gear to impart rotary motion to the crown gear about its center axis. A drive pin connected to the crown gear has an eccentric pin eccentrically offset relative to the center axis of the crown gear for engagement in the slot of the drive shaft so as to impart the reciprocating movement to the drive shaft on rotation of the crown gear.

19 Claims, 10 Drawing Sheets

(56) References Cited

U.S. PATENT DOCUMENTS

| | | | |
|---|---|---|---|
| 5,581,896 A | 12/1996 | Yang | |
| 5,832,611 A * | 11/1998 | Schmitz | 30/392 |
| 5,940,977 A * | 8/1999 | Moores, Jr. | 30/392 |
| 6,234,255 B1 | 5/2001 | Feldmann et al. | |
| 6,357,125 B1 | 3/2002 | Feldmann et al. | |
| 6,370,781 B1 * | 4/2002 | Sasaki | 30/392 |
| 6,568,089 B1 * | 5/2003 | Popik et al. | 30/392 |
| RE38,606 E * | 10/2004 | Bednar et al. | 30/394 |
| 6,810,589 B2 | 11/2004 | Lagaly et al. | |
| 6,862,968 B1 | 3/2005 | Ogston | |
| 6,976,313 B2 * | 12/2005 | Wong | 30/369 |
| 7,121,007 B2 | 10/2006 | Ogston | |
| 7,191,847 B2 * | 3/2007 | Haas | 173/114 |
| 7,246,533 B2 | 7/2007 | Lagaly et al. | |
| 7,658,012 B2 | 2/2010 | James et al. | |
| 7,707,729 B2 | 5/2010 | Moreno | |
| 7,793,419 B2 * | 9/2010 | Maxim | 30/392 |
| 7,895,909 B2 * | 3/2011 | Hartmann | 74/25 |
| 7,908,949 B2 | 3/2011 | Ogston | |
| 8,667,697 B2 * | 3/2014 | Hittmann et al. | 30/392 |
| 2003/0070307 A1 | 4/2003 | Walker | |
| 2004/0117993 A1 | 6/2004 | Armstrong | |
| 2004/0255475 A1 * | 12/2004 | Hirabayashi et al. | 30/392 |
| 2005/0022395 A1 * | 2/2005 | Hirabayashi | 30/392 |
| 2005/0178223 A1 | 8/2005 | Li et al. | |
| 2006/0117580 A1 * | 6/2006 | Serdynski et al. | 30/392 |
| 2008/0066325 A1 * | 3/2008 | Peterson et al. | 30/392 |
| 2008/0104852 A1 * | 5/2008 | Prieto | 30/392 |
| 2010/0162579 A1 * | 7/2010 | Naughton et al. | 30/392 |
| 2011/0265335 A1 * | 11/2011 | Bantle et al. | 30/394 |
| 2012/0192440 A1 * | 8/2012 | Jerabek et al. | 30/393 |
| 2013/0019483 A1 * | 1/2013 | Naughton et al. | 30/376 |
| 2013/0247391 A1 * | 9/2013 | Armstrong | 30/392 |
| 2014/0007436 A1 * | 1/2014 | Gregorich | 30/392 |

* cited by examiner

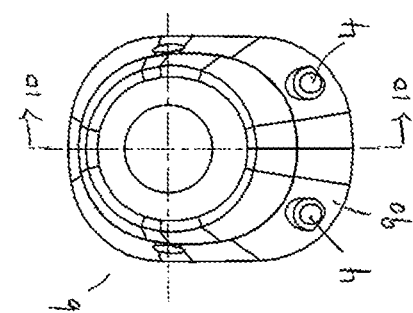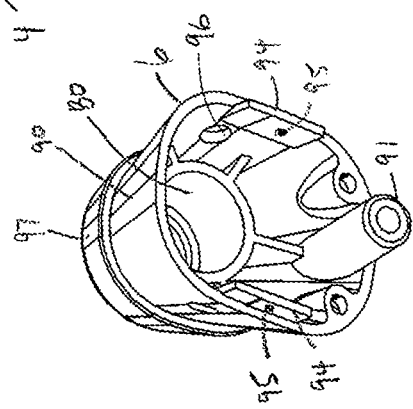

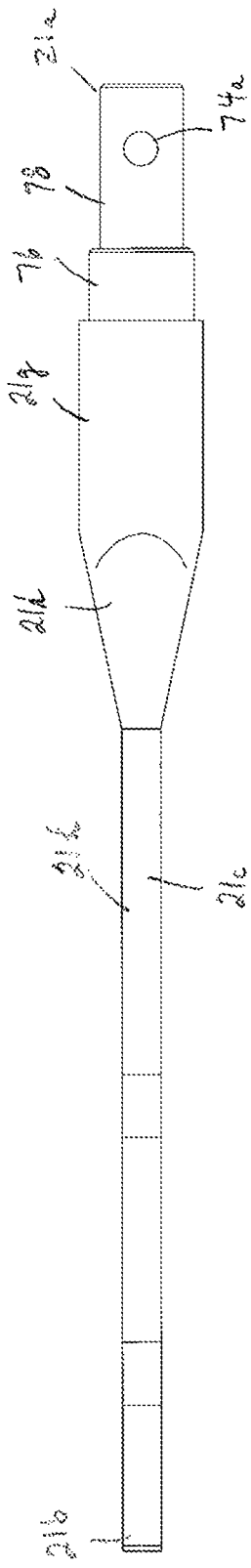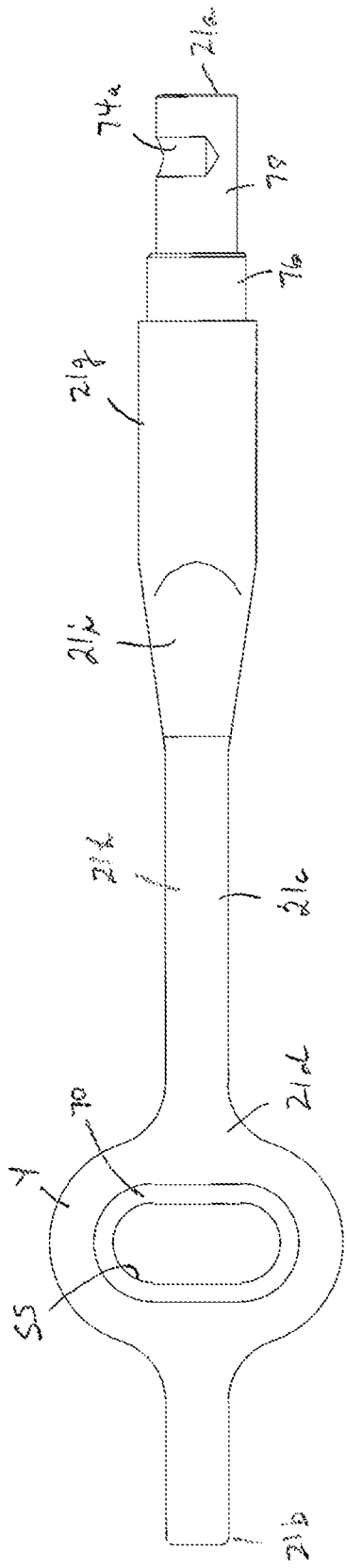
FIG. 11B
FIG. 11A

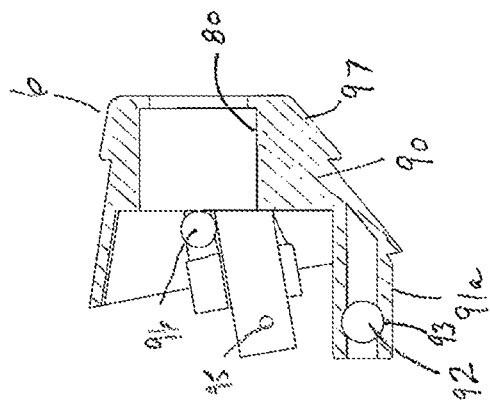
FIG. 12E  FIG. 12C
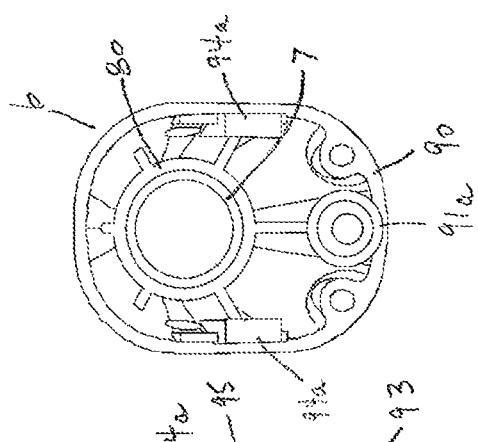
FIG. 12D
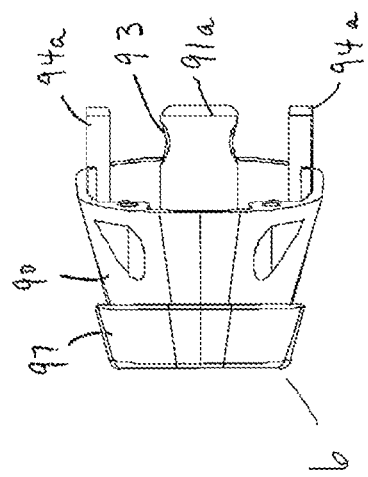
FIG. 12A
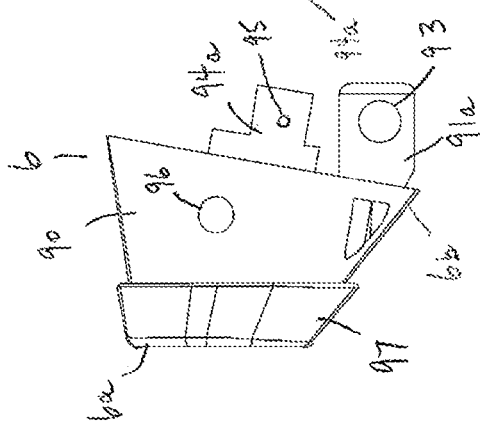
FIG. 12B
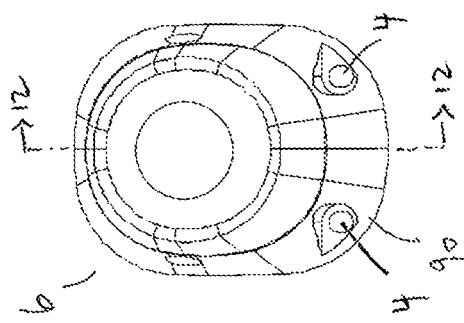

RECIPROCATING POWER TOOL

CROSS-REFERENCE TO RELATED APPLICATION

This application claims priority from U.S. Provisional Patent Application No. 61/487,605 filed May 18, 2011, which is incorporated by reference herein to the extent that there is no inconsistency with the present disclosure.

BACKGROUND OF THE INVENTION

This invention relates to a reciprocating power tool and drive mechanism for same, such as for a automobile windshield or other glazing removal operations, which involve cutting a urethane bed around the windshield or glass perimeter and separating the glass or windshield from a vehicle.

In the process of securing a glass windshield to a new car or truck, the manufacturer first extrudes a bead or "bed" of urethane onto the "pinch weld" extending around the perimeter of the window opening. The urethane bed bonds to the pinch weld surface. The glass windshield then is seated on the bed and bonds to it, forming a liquid-tight seal. The urethane bed is hard and tough and not easily penetrated. It commonly has a thickness of about ¼ inch and width of about ⅓-¾ inches, widening to about 3½-4" or more at the corners.

If the windshield is to be replaced, an installer severs the urethane bed along its length, just beneath the inside surface of the glass, leaving the base portion of the bed in place, without causing damage to the glass, the vehicle frame or the pinch weld. The cut surface of the bed is then primed, a new bead of urethane is deposited on the primed surface, and a replacement windshield is seated onto the fresh bead to bond it in place.

Until the late 1980's installers used a manually operated knife to sever the urethane bed. The knife was generally L-shaped, having a narrow sharpened blade and a shank or handle equipped with hand grips. The installer would first work the point of the blade inwardly to penetrate the bed and would then reciprocate the blade with short in and out strokes while pulling the blade sideways to saw through the urethane bed along its length. Commencing about 1990, two types of powered tools were introduced commercially, to replace the manually operated tools. These powered tools mimicked the manually operated knife in several structural and operational respects. The first type of tool involved an L-shaped blade and shank powered by an electric motor. The blade was oscillated from side to side. The blade was pointed at its end and narrow (about ½ inch wide), to facilitate initial manual penetration. The side edge of the blade was sharpened, so that a lateral cutting action was produced. The second type of tool involved reciprocating a blade which would extend in and out of a sleeve. The blade was actuated by an electric motor. Again, the blade was pointed and narrow (about ½ inch width), to facilitate initial penetration. The "throw" or distance advanced by the blade was short, about ½ inch.

In use, these early power tools were characterized by several problems. More particularly:

Cutting with them was slow.

The depth and width of the cut were small, requiring a great many cuts to complete the job.

Typically it would take about 15-20 minutes to cut the windshield free.

Using the prior art assemblies was laborious. The installer would have to apply a sideways pull to these tools, particularly when cutting along the horizontal legs of the bed.

It was common to crack the glass when first penetrating the bed. This could leave broken glass on the dash and elsewhere, which was undesirable.

The cuts made by the tools were shallow. One could only cut into the bed with these tools about ½ inch at a time. This meant that at the corners, where the bed width was greatest, it would take prolonged cutting to complete severing the bed. In practice, the installer would revert to using a hand knife at the corners or would break off the glass at the corners and have to later complete the cut by hand of the corner urethane with its embedded glass.

In the course of hand cutting the corners, installers would commonly press hard with their head against the windshield to assist in cutting, leading to neck injuries.

The cut surface produced by the blades of these powered tools was irregular, tagged and undulating. This was undesirable as the newly extruded bead would in part reproduce this underlying irregularity and the new windshield would then not seat flush against the bed surface. This could lead to a poor seal and subsequent leaking.

The electric motor-driven tools of the prior art were generally bulky and difficult to work with in the confined space of the apex between the vehicle dashboard and the inside surface of the windshield.

The prior art blades were fragile and expensive; breakage was a problem.

It was necessary to use soapy water as a coolant and lubricant for the narrow, rapidly moving blades. After the cut was complete, the cut surface needed to be carefully washed to remove soap, as it was detrimental to getting a good bond when new urethane was laid on to the old bed.

Against this backdrop, an air powered windshield removal assembly is described in U.S. Pat. No. 6,862,968, issued Mar. 8, 2005 and in U.S. Pat. No. 7,121,007 issued Oct. 17, 2006, both naming inventor Ogston, and both being commonly owned by Crystal Glass Canada Ltd., the owner of the current application. The assembly included a modified reciprocating air gun which attached through a shaft to a unique, bell-shaped blade. The blade was wide at its front end and narrowed toward its rear (shank) end. The shank was connected to the reciprocating shaft of the air gun.

While the above Ogston assembly was a marked improvement over many of the other prior art devices, it presented its own unique issues, including:

The sharp corner edges at the front end of the blade could damage either or both of the pinch weld of the vehicle holding the windshield, or to the dashboard or upholstery of the vehicle.

Due to the extreme flexing requirements for the blade during use against the windshield, including twisting motions, the blade could break at the stress point between the bell shaped side edges of the blade and the straight shank side edges where the blade connected to the shaft. As well, the shaft could break at the stress point at the connection to the blade.

Penetration of the urethane bed, particularly at the corners where the bed is deepest, was sometimes still difficult.

Cutting around the corners of the windshield presented some difficulty, with the sharp corners limiting movement around the corner.

Cutting was primarily in the vertical (i.e., forward) direction, as the front end of the blade cut into the urethane bed. To move the blade along, particularly in the wider urethane bed at the bottom of the windshield, the installer would reposition the blade for each new cut into the urethane bed. While the wider blade made the operation much faster than with the prior art designs, it still took several minutes to remove the windshield.

In some newer vehicle designs the urethane bed has become wider as the windshield have moved to more aerodynamic designs, and the urethane bed has become an integral part of the structural strength of the vehicle. The bell-shaped blades could not be simply elongated to accommodate the needed deeper penetration without the blade becoming too fragile when flexed, i.e., if elongated beyond about 7.75 inches, the bell-shaped blades would break at their stress point (i.e., where the blade side edges joined to the shank).

The air gun, while suitable for some applications, did not meet all customer needs. Cordless and electrical power units were also desirable.

These blade breakage problems described above were addressed with a new blade design in U.S. Pat. No. 7,908,945, issued Mar. 12, 2011 to Ogston, and owned by Crystal Glass Canada Ltd. However, the reciprocating power units used to drive the blades still have many of the problems outlined above, leading to breakage of the external shaft at its forward end where it connects to the blade and/or breakage at the connection of the external shaft to the internal drive shaft of the power tool. As well, the reciprocating drive mechanism used in the power tool were often a simple adaption of a reciprocating saw drive mechanism, which is not designed for the high impact, short linear stroke and loading for the complete cycle needed to drive a windshield removal tool, leading to tool failure. Many reciprocating drive mechanisms use a wobble mechanism to convert rotary motion to reciprocating linear motion. Others use a scotch yoke type mechanism to convert rotary motion to reciprocating linear motion.

SUMMARY OF THE INVENTION

In one embodiment, there is provided a reciprocating power tool, including:

a housing having a forward end portion and a rear end portion;

a handle at the rear end portion;

a drive shaft mounted in the housing for reciprocating movement relative to the housing along a center longitudinal axis of the drive shaft in a forward and rearward direction, the drive shaft having a front end adapted for attachment to an external shaft or to a tool attachment, and a rear end, and forming a slot oriented perpendicular to the longitudinal center axis of the drive shaft between the front end and the rear end;

a motor supported in the housing and having a driven shaft for imparting rotary movement to a pinion gear connected to the driven shaft;

a trigger switch mounted on the handle to operate the motor;

a crown gear mounted in the housing and adapted to mesh with the pinion gear for imparting rotary motion to the crown gear about a center axis of the crown gear;

a drive pin connected to the crown gear, the drive pin forming an eccentric pin which is eccentrically offset relative to the center axis of the crown gear for engagement in the slot of the drive shaft so as to impart reciprocating movement to the drive shaft on rotation of the crown gear, the drive pin being connected to the crown gear at two or more points centered on and straddling the center axis of the crown gear; and the drive shaft having a rectangular cross section between the front end and the rear end and being retained within the housing adjacent the front end by a front end bushing and adjacent the rear end by a rear end bushing.

The rectangular cross sectional portions of the drive shaft assist in accommodating the high torsional stresses placed on the drive shaft with a high impact tool, while providing secure locking into the front end and rear end bushings which in turn are formed to mate with the rectangular cross sectional sections of the drive shaft.

The reciprocating power tool may be adapted such that one or more of the drive shaft, crown gear and drive pin are counterbalanced to reduce vibration caused by reciprocating movement of the drive shaft. In one embodiment, a counterweight is formed on a first half portion of the crown gear. In this embodiment, the eccentric pin is located in a second half portion of the crown gear diametrically opposite to the counterweight. These features reduce the vibrational forces of a high impact, high speed tool (typically 2800-3600 strokes per minute) having a short linear stroke (typically 5-15 mm).

The drive pin may be formed to include a base section and two connecting pins extending from the base section adapted to be received in openings in the crown gear, the openings being located on a diameter of the crown gear and being centered on the center axis of the crown gear. In this embodiment, the eccentric pin extends from the base section in a direction opposite to the connecting pins, and is aligned with the connecting pins on the same diameter of the crown gear.

The eccentric pin may include a collar bushing adapted for rotation on the eccentric pin, the collar bushing being formed of a wear resistive material, and the collar bushing forming an outwardly extending lip at a lower end proximate the base section of drive pin. In this embodiment, the drive shaft forms a recess around an outer periphery of the slot adapted to receive and retain the lip of the collar bushing. The collar bushing accommodates the high impact and wear which would otherwise be transferred to the eccentric pin due to torque and loads on the drive shaft, or wear on the drive shaft bushings. The collar bushing can be replaced after a wear cycle without causing excessive wear to other components of the drive mechanism.

The front end bushing for the drive shaft may be formed as a split bushing, for ease of assembly. The drive shaft may have a cylindrical section (i.e., round in transverse cross section) forward of the front end bushing, and the front end may be adapted to be received and connected in a socket type connection within one or more stepped counterbores formed in a rear connecting end of the external shaft. In this embodiment, the external shaft may have a cylindrical section (i.e., round in transverse cross section) at its rear end for attachment to the drive shaft. This embodiment reduces the notch effect and flaring of the connection between the drive shaft and the external shaft. The connection between the shafts may be provided at a point internal of the tool (i.e., rearwardly of a front nose cone on the housing), or external of the tool (i.e., forward of the nose cone).

To assist in stabilizing the drive shaft and the external shaft against the high torque placed on the shafts during operations such as windshield removal, the reciprocating power tool may further include a nose cone removably connected to the housing through which the drive shaft or the external shaft may extend, and a nose cone bushing formed in the nose cone for supporting and lubricating the drive shaft, or the external shaft extending through the nose cone, equally through 360°. The nose cone bushing may have a cylindrical shape (i.e., round in transverse cross section) adapted to receive the cylindrical section of the drive shaft or of the external shaft.

Also provided is a drive mechanism for a reciprocating power tool, the drive mechanism including:

a drive shaft having a front end adapted for attachment to an external shaft or to a tool attachment, a rear end, a center longitudinal axis, and forming a slot oriented perpendicular to the center longitudinal axis between the front end and the rear end;

a motor having a driven shaft for imparting rotary movement to a pinion gear connected to the driven shaft;

a trigger switch to operate the motor;

a crown gear adapted to mesh with the pinion gear to impart rotary motion to the crown gear about a center axis of the crown gear; and a drive pin connected to the crown gear, the drive pin forming an eccentric pin which is eccentrically offset relative to the center axis of the crown gear for engagement in the slot of the drive shaft so as to impart reciprocating movement along the center longitudinal axis of the drive shaft on rotation of the crown gear, the drive pin being connected to the crown gear at two or more points centered on and straddling the center axis of the crown gear.

BRIEF DESCRIPTION OF THE DRAWINGS

FIG. 5A is a perspective view of the internal drive shaft, looking at the recess on the bottom or lower surface surrounding the slot, while

FIG. 6A is a bottom view of another embodiment of an internal drive shaft showing an extended front portion for connection to an external shaft at a point forward of the nose cone, while

FIGS. 10A-10F are six views of the nose cone from FIG. 4, adapted to secure a nose bushing, as shown in FIG. 2, for the internal shaft of FIGS. 5A, 5B, with FIG. 10A being a side perspective view; FIG. 10B being a rear perspective view; FIG. 10C being a front perspective view; FIG. 10D being a rear end view; FIG. 10E being a side view, and FIG. 10F being a sectional view along line 10-10 of FIG. 10C.

FIG. 11A is a bottom view of a further embodiment of an internal drive shaft, similar to FIG. 6A, but having an elongated transition portion from the rectangular mid-portion to the cylindrical section, while FIG. 11B is side view of the same internal drive shaft.

FIGS. 12A-12E are five views of a further embodiment of the nose cone, adapted to secure a nose bushing for the internal shaft of FIGS. 11A, 11B, with FIG. 12A being a side perspective view; FIG. 12B being a front perspective view; FIG. 12C being a rear end view; FIG. 12D being a side view; and FIG. 12E being a sectional view through line 12-12 of FIG. 12B.

FIG. 13B being a side view; and FIG. 13C being a sectional view taken along line 13-13 of FIG. 12B.

DETAILED DESCRIPTION OF THE INVENTION

Figure 1:
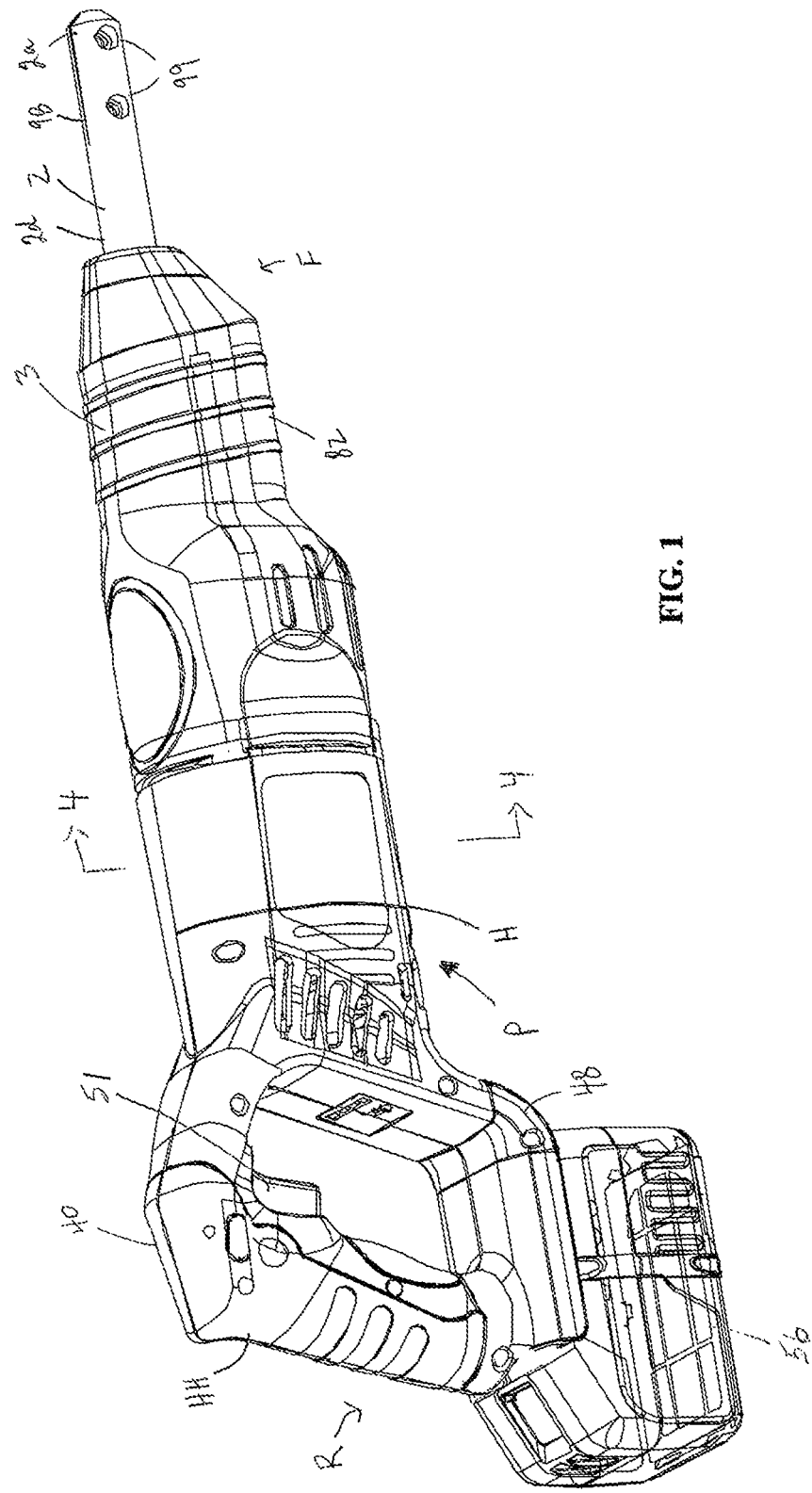
FIG. 1 is a perspective view of one embodiment of the battery operated reciprocating power tool, shown with an external shaft protruding from the front nose boot at the front or forward end of the tool, the external shaft being adapted to receive a windshield removal blade such as those shown in the Ogston patents mentioned above.
Figure 2:
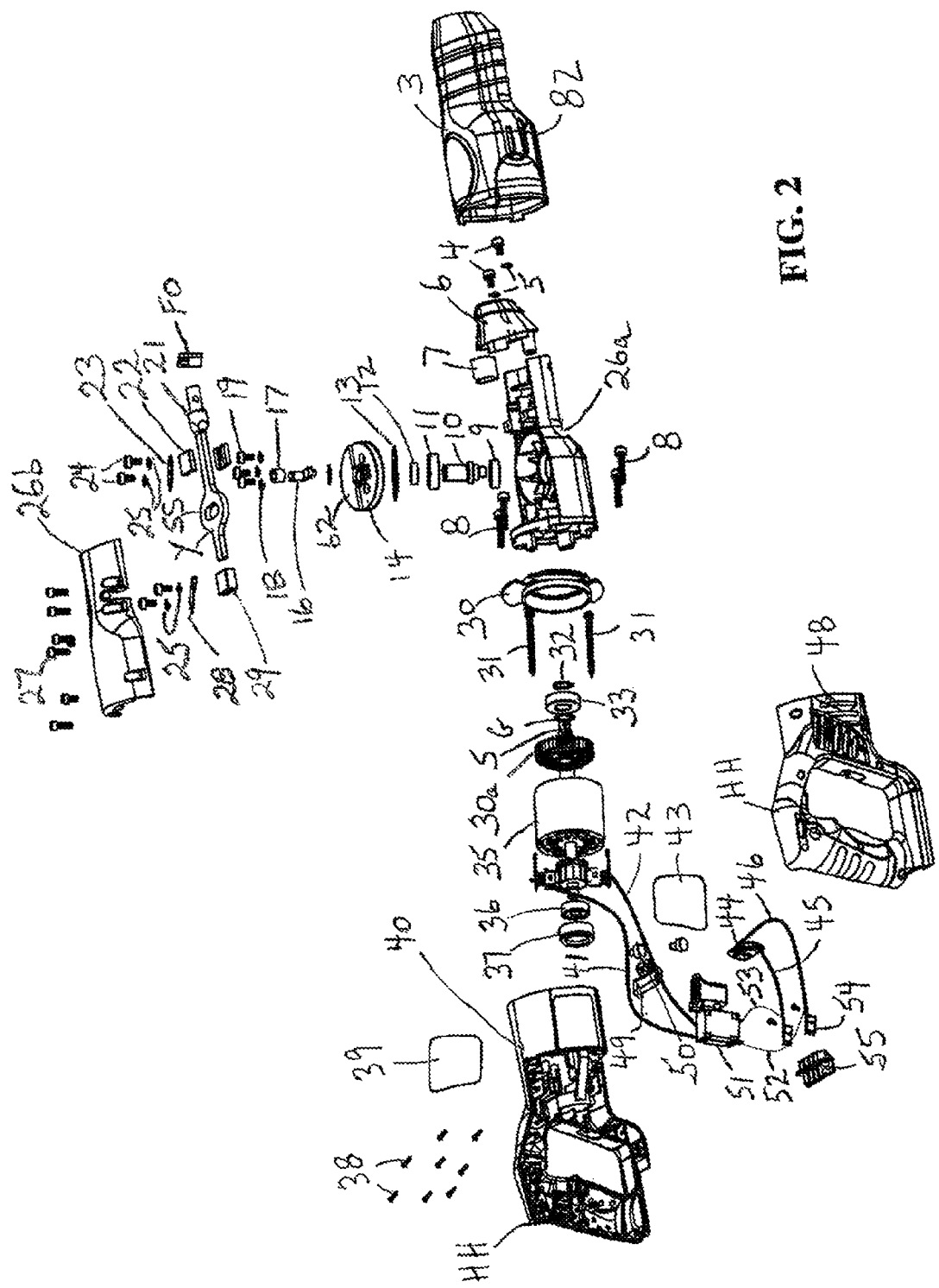
FIG. 2 is an exploded view of the reciprocating power tool of FIG. 1.
Figure 3:
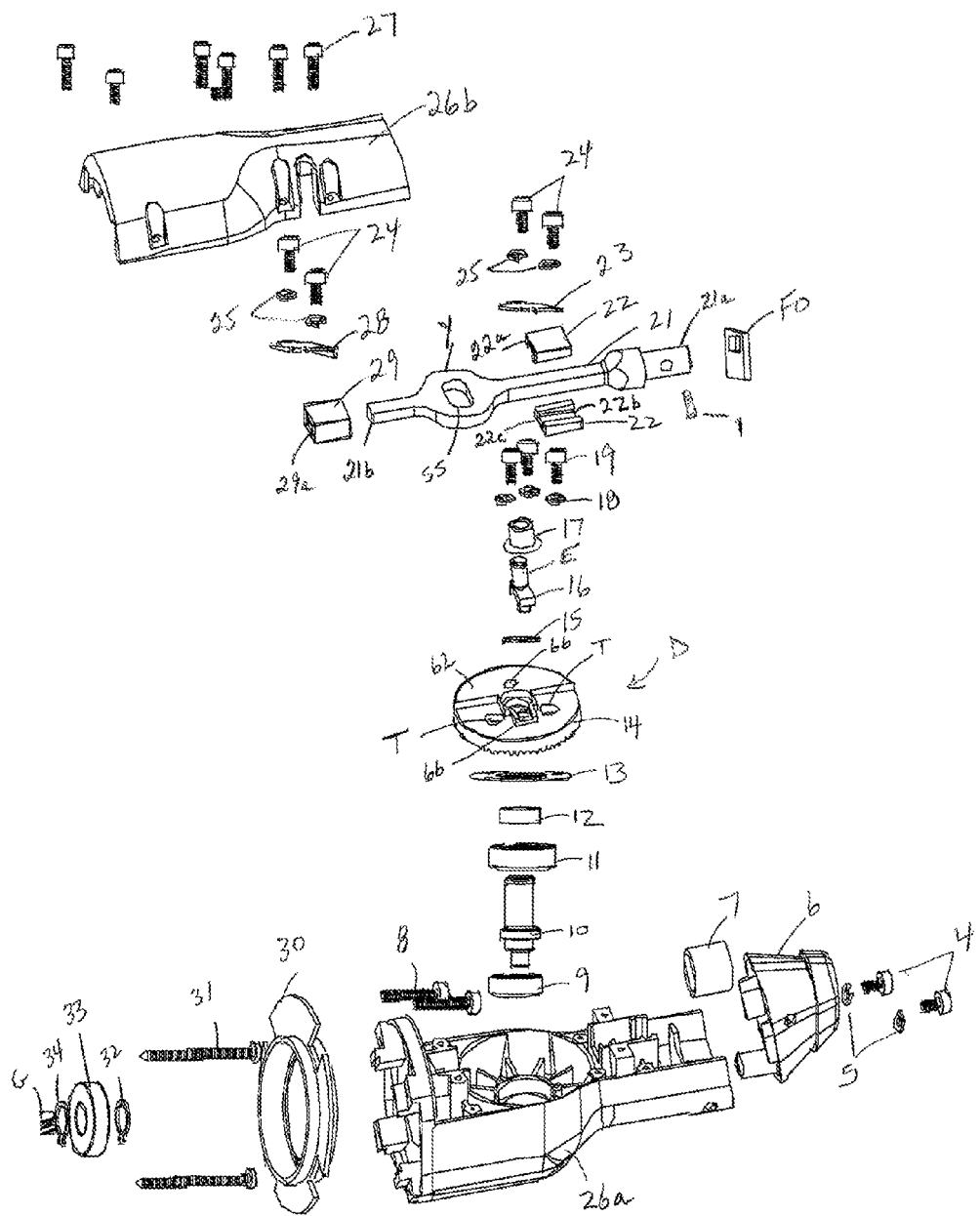
FIG. 3 is an exploded view of the drive mechanism components of FIG. 2 which convert rotary power from the battery powered motor to a reciprocating motion for the internal drive shaft and for the external shaft.
Figure 4:
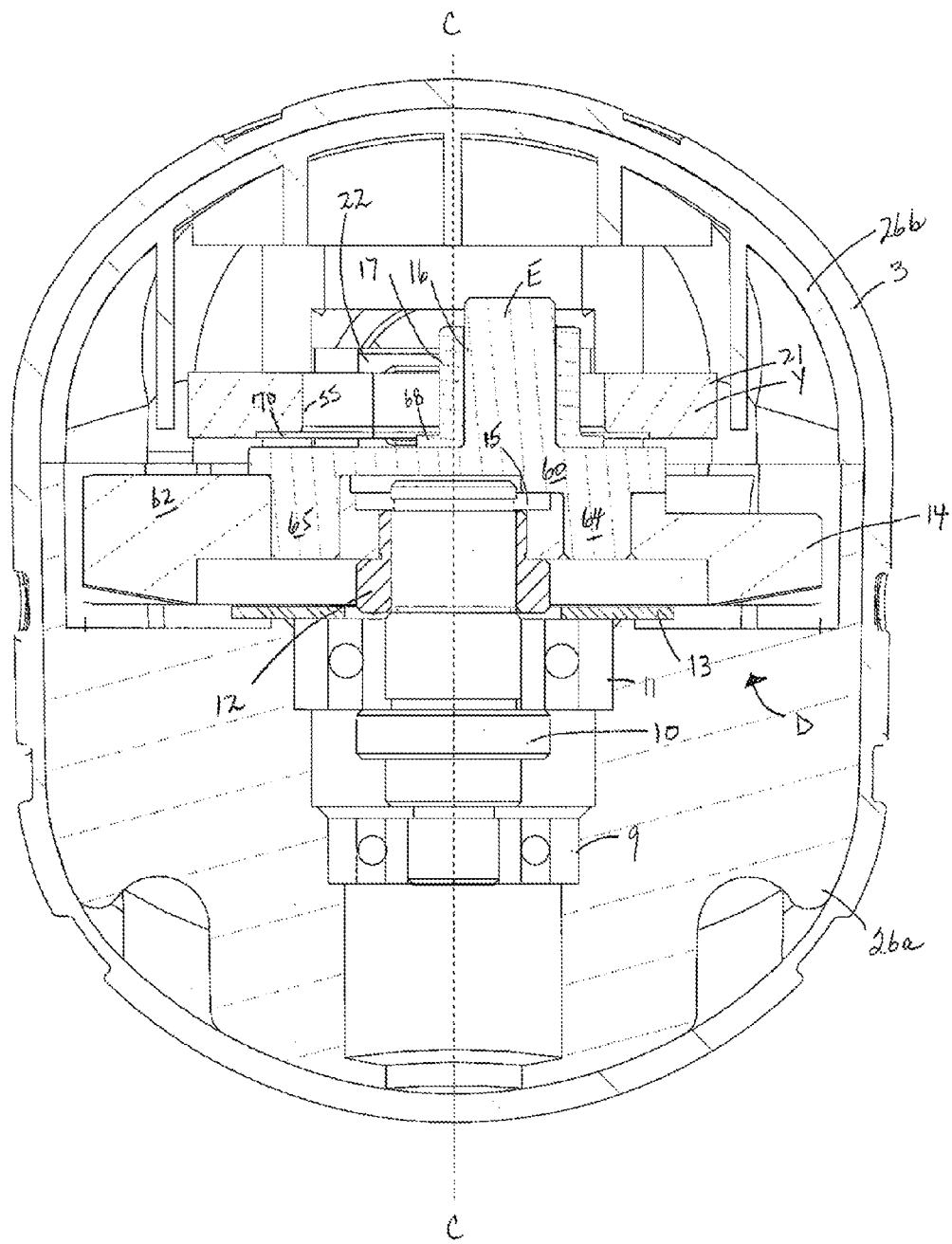
FIG. 4 is a sectional view along through the line 4-4 of FIG. 1 to show the drive mechanism components to convert rotary motion to reciprocating motion.
Figure 5A:
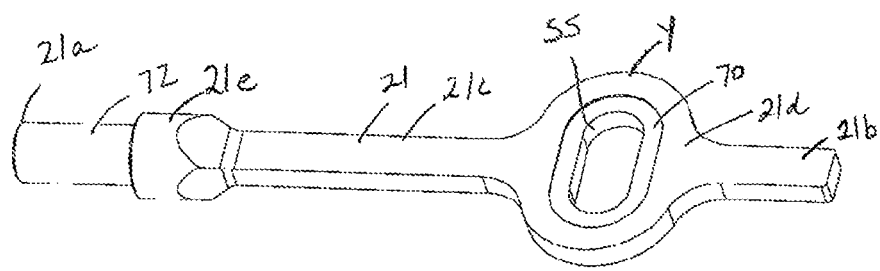
Figure 5B:
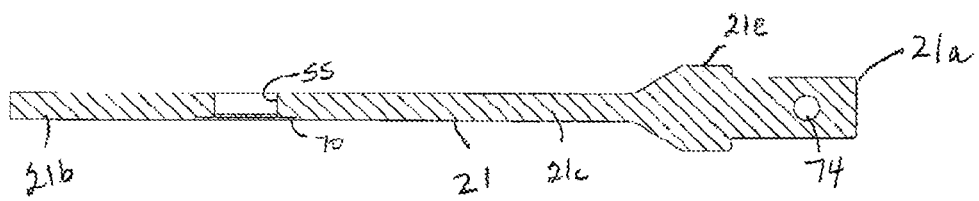
FIG. 5B is a sectional view through on the long axis of the drive shaft through the slot and a connecting pin hole at its front end.
Figure 13A:
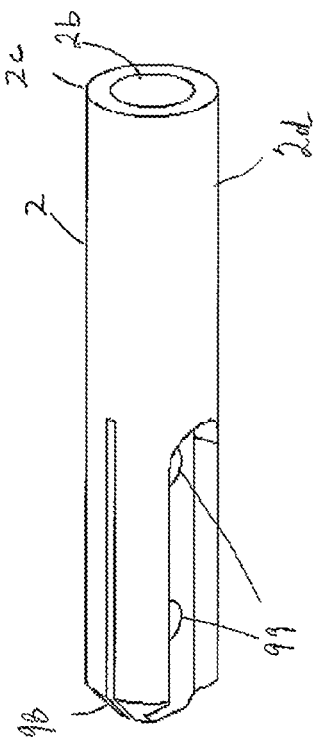
FIGS. 13A-13C are three views of the external shaft to connection forwardly of the nose cone to the drive shaft of FIGS. 11A, 11B, with FIG. 13 being a side perspective view.
Figure 13B:
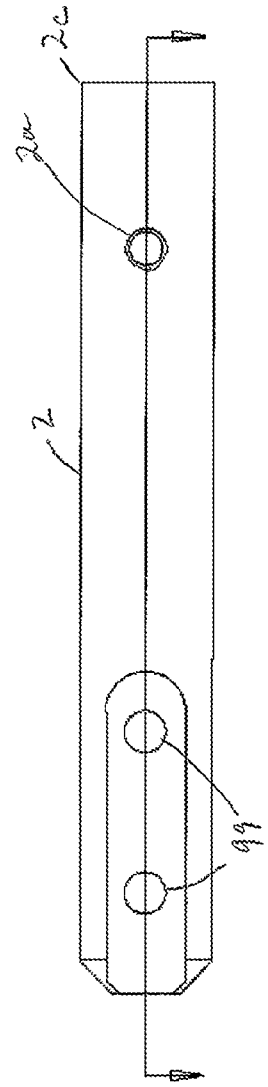
Figure 13C:
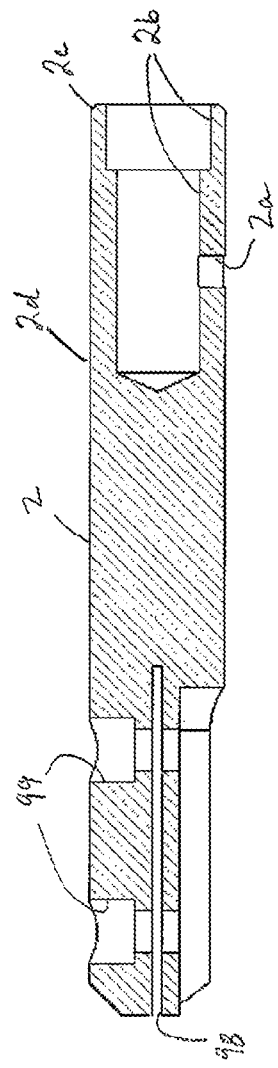

Having reference to FIGS. 1-13, exemplary embodiments of the power tool P and its components are shown, with FIGS. 1 and 4 showing the tool in connected views, and FIGS. 2 and 3 showing the tool in exploded views. The tool P is shown to have a front or forward end F, and a rear or rearward end R. Components of the drive mechanism D are shown in greater detail in FIGS. 5-9. A removable nose cone 6 may be included, as shown in FIGS. 10A-F and 12A-E to accommodate a nose cone bushing 7. Alternate embodiments of an internal drive shaft are shown in FIGS. 5A, 5B; 6A, 6B; and 11A, 11B. An external shaft adapted to connect between the drive shaft of FIGS. 11A, 11B and to a windshield removal blade is shown in FIGS. 13A-13C.

The power tool P includes a housing H, including a left body 40 and a right body 48 connected by screws 38 and optionally providing left and right label plates 39 and 43. A handle HH is formed at the rear of the housing H, with a variable speed trigger switch mechanism 51 connected to a battery pack 56. The battery pack 56 may be loaded from the rear in a sliding motion, and locked to the body parts 40, 48 to reduce the tendency to becoming dislodged during the high impact stroke of the tool P. Other battery connection components include socket bracket 55, socket 54, wires 52, 53, rubber block 50, shift button 49, screws 47, wires 45, 46, power display PCB 44, and wires 41, 42.

The left and right bodies house a high speed motor 35 having a driven shaft S to rotate a pinion gear G. Other motor components include rubber ring 37, bearing 36 (example 608Z bearing), bearing 33 (example 6001z bearing), snap rings 32, 34 motor vent plate 30, vent fan 30a, and screws 31 to retain the vent plate 30 to the motor 35. The motor 35 may be A.C. in line powered or battery driven, as is generally known in the art. In the Figures, the motor 35 is shown to be open frame design for better cooling, and battery driven. For example, a 28V battery driven motor for windshield removal applications may deliver high power, ex. 980 W, high speed, ex. 22,000 rpm, high current, high stall amp loading, ex. 164 A, and high torque ex. 20,500 g·cm. A lower rated voltage motor, for example an 18 V battery driven motor might be used for less demanding glass removal operations.

The housing H further includes an lower gearbox housing 26a and an upper gearbox housing 26b, connected together with screws 27, and connected to the motor left and right bodies 40, 48 with screws 8. The combined gearbox housing 26a, 26b houses the components of the drive mechanism D, which is operative to convert rotary motion of the motor driven shaft S to a reciprocating linear motion to an internal drive shaft 21. The nose cone 6 is connected at the front of the lower gearbox housing 26a with screws 4 and washers 5, and as described in greater detail below. The nose cone 6 houses a cylindrical nose cone bushing 7, as better seen in FIGS. 10A-F, and FIGS. 12A-12E. The internal drive shaft 21 may be connected at its front end 21a to the external shaft 2 with screw 1, which extends through threaded port 2a of the external shaft 2. The nose cone bushing 7 stabilizes and supports the internal drive shaft 21 and the external shaft 2 from side loading at any angle through 360° symmetry, as better described below.

The drive mechanism D includes the drive shaft 21 above a crown gear 14. The crown gear 14 is generally cylindrical, with teeth on its lower surface which mesh with the pinon gear G to rotate the crown gear 14 about a center axis of the crown gear 14. Support for the crown gear 14, and retention within gear box housing 26a, 26b, include lower bearing 9 (example 608z bearing), drive axle 10, upper bearing 11 (example 6001zz bearing), compression ring 12 (which holds crown gear 14 to drive axle 10), retainer plate 13, and gear retainer/snap ring 15. Snap ring 15 may alternatively be replaced with a laser weld. The crown gear 14 is formed with through holes T (two shown), through which screws 19 (three shown) extend, with washers 18, for threaded connection to the retainer plate 13 and gearbox housing 26a. A drive pin 16 is connected to the crown gear 14, as more fully described below. The drive pin 16 includes upwardly extending eccentric pin E, on which a collar bushing 17 is mounted. The components of the drive mechanism D are shown in exploded view in FIGS. 2, 3, and connected in FIG. 4.

The drive shaft 21 is formed with a oval slot SS in a yoke section Y between its front and rear ends 21a, 21b. The oval slot SS is oriented such that a center line through the longer dimension of the slot opening is perpendicular to the longitudinal axis L of the drive shaft 21. The oval slot SS receives the drive pin 16 to convert rotary motion to linear reciprocating motion. Alternatives to the oval slot SS might be used, such as grooves or guides. Thus, the term "slot" as used herein and in the claims is meant to include alternatives such as grooves or guides.

The cross sectional shape of the drive shaft 21 at its rear end 21b and in a mid-section 21c is rectangular, such as square. The cross sectional shape of the drive shaft 21 is round at its front end 21a. A rear end bushing 29, with a mating rectangular cross section opening 29a is fitted at the rear end 21b of the drive shaft 21. A front end bushing 22, formed as a top and bottom split bushing 22a, 22b with a mating rectangular cross sectional opening 22c accommodates the rectangular mid-section 21c of the drive shaft 21. The bushings 22, 29 are held to the lower gearbox housing 26a with front and rear retainer plates 23, 28, which in turn are held by screws 24 and washers 25. A front felt oiler FO is included at the front end 21a of the drive shaft 21, and optionally at the rear end 21b of the shaft 21. The front and rear end bushings 22, 29 lock the drive shaft 21 against rotation, in a uniform manner, as the operator twists and flexes a windshield removal blade which may be attached to the shaft 2 at the front F of the tool P. This locked position of the shaft 21 within the bushings 22, 29 maintains the drive shaft 21 in a position generally perpendicular to the drive pin 16 (i.e., the longitudinal center axis L of the drive shaft 21 is maintained perpendicular to the vertical axis of the eccentric pin E of the drive pin 16). This locked position within the front end and rear end bushings 22, 29 reduces wear on the drive mechanism components, greatly extending the service life of the tool P.

The bushings 22, 29 and 7 may all be formed of hardened materials, such as hardened steel or bronze, for better wear.

As described above, the drive pin 16 is formed with an eccentric pin E. The eccentric pin E extends vertically upwardly (relative to the plane of the crown gear 14) from a base section 60 of the drive pin 16. The eccentric pin E is eccentrically offset relative to the center of the base section 60 and relative to the center axis C-C of the crown gear 14 (see FIGS. 4, 7 and 9B) for engagement in the slot SS of the drive shaft 21 so as to impart forward and rearward reciprocating movement to the drive shaft 21 on rotation of the crown gear 14. The drive pin 16 is connected to the crown gear 14, for example with a press fit, at two or more points centered on and straddling the center axis C-C of the crown gear 14. The offset between the center axis C-C and the vertical axis of the eccentric pin E is one half of the linear stroke of the tool P. For windshield removal, this linear stroke is relatively small, such as between about 5 and 15 mm, for example about 10 mm.

To counterbalance against vibration of a high impact, high speed, and short stroke power tool, one or more of the drive mechanism components may be formed with a counterweight. The counterweight might be provided at the rear end 21b of the drive shaft 21, on the crown gear 14, or at a rear-facing portion of the drive pin 16. In the Figures, a counterweight 62 is shown to be formed on a first half portion of the crown gear 14. For balance, the eccentric pin E is located in the first half portion of the crown gear 14 diametrically opposite to the counterweight 62. The counterweight may conveniently be formed by machining the crown gear 14 to be thicker on the weighted half portion of the crown gear 14, as shown in the Figures. Alternate counterweights may be used, for example by including inserts or denser materials, but the illustrated embodiment is a simple approach. This counterbalanced crown gear 14 is designed with a balanced twin mounting point (two points or more) over the center drive axle 10 (center axis C-C) for the drive pin 16.

The drive pin 16 is connected to the crown gear 14 so that its connecting points are centered on the center axis C-C of the crown gear (i.e., two or more connecting points equally spaced from the center axis C-C), and to straddle the center axis C-C of the crown gear 14. In the embodiment of the Figures, the drive pin 16 is formed with two connecting pins or legs 64, 65, extending downwardly from the base section 60 of the drive pin 16, and adapted to be received, for example by press fitting, in openings 66 in the crown gear 14. The openings 66 are located in line, on a diameter of the crown gear, and are centered on the center axis C-C of the crown gear 14. In an alternate embodiment, the three connecting points between the drive pin and the crown gear may be used, with triangular symmetry to the center axis C-C.

As above-described, the drive pin 16 connects to the crown gear 14 at the two or more connecting points equally spaced from the center axis C-C. This balanced connection enables the drive pin 16 to withstand full loading in both stroke directions (forward and rearward).

Figure 7:
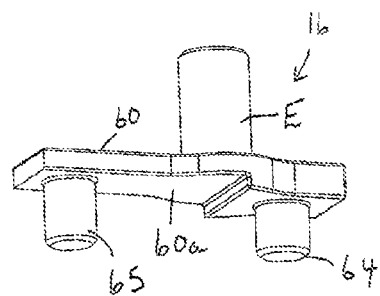
FIG. 7 is a perspective view of the driver pin component from FIG. 4.
Figure 9A:
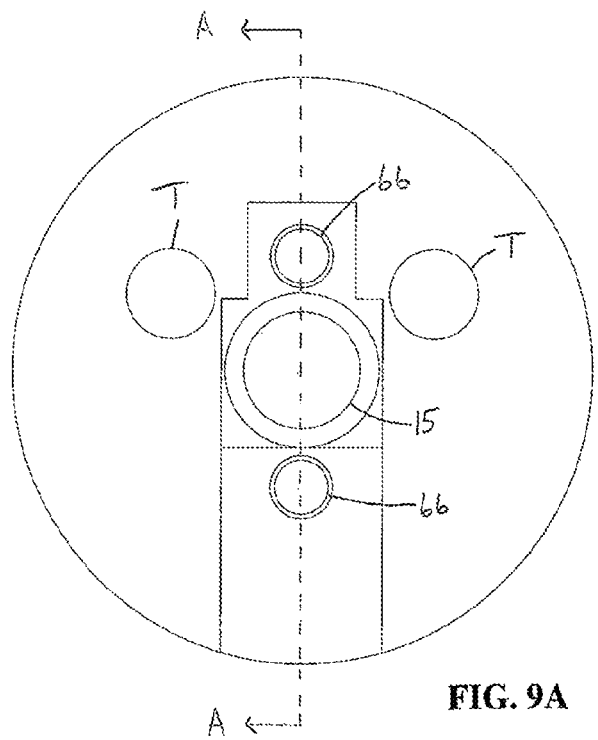
FIG. 9A is a top view of the crown gear component from FIG. 4.
Figure 9B:
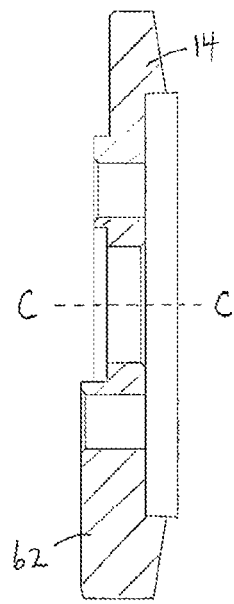
FIG. 9B is sectional view of the crown gear component taken along line A-A of FIG. 9A.

As shown in FIG. 7, the base section 60 of the drive pin 16 is stepped on its lower surface 60a, to accommodate the counterweight 62, and the pin 64 which is positioned opposite the counterweight 62 is shorter than the pin 65 which extends through the counterweight 62. This achieves balance for the counter weighted embodiment during rotation of the crown gear 14 to counteract the extreme vibration caused by the high impact and short stroke reciprocation of the drive shaft 21, as the eccentric pin E rotates with the crown gear 14, within the slot SS of the drive shaft 21. In this embodiment, the eccentric pin E extends from the base section 60 in a direction opposite (i.e., upwardly in the Figures) compared to the connecting pins 64, 65, which extend downwardly in the Figures. The eccentric pin E is aligned with the connecting pins 64, 65 on the same diameter of the crown gear 14 (i.e., one plane bisects each of the pins E, 64, 65 through a central section).

Figure 8:
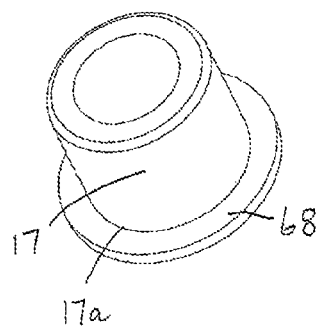
FIG. 8 is a perspective view of the collared bushing for the driver pin of FIG. 7.

The eccentric pin E may include a collar bushing 17 adapted for rotation on the eccentric pin E (see FIG. 8). The collar bushing 17 may be formed of a wear resistive material such as hardened steel. The collar bushing 17 forms an outwardly extending lip 68 at its lower end 17a adapted to be located proximate the base section 60 of drive pin 16. In this embodiment, the drive shaft 21 forms a recess 70 around an outer periphery of the slot SS on the bottom or lower surface 21d (i.e., surface facing the crown gear 14) of the drive shaft 21. The recess 70 is adapted to receive and retain the lip 68 of the collar bushing 17 in its connected position in the gearbox 26a, 26b (see FIG. 4). The collar bushing 17 accommodates the high impact and wear which would otherwise occur on the eccentric pin E, as torque is applied to the drive shaft 21 (for example during twisting of a windshield removal blade at the front F of the tool P). Also, as the front and rear end bushings 22, 29 wear, for example from torque on the drive shaft 21, the torque is transferred to the lip 68 of the collar bushing 17. The collar bushing 17 can be replaced after a wear cycle without causing excessive wear to other components of the drive mechanism D.

As described above, the drive pin 16 is designed to straddle the center axis C-C of the crown gear 14, providing an even, strong and balanced connection of the drive pin 16 to the crown gear 14. This hardened steel collar bushing 17 is designed to reduce the wear and vibration created when converting rotational motion to the lineal drive motion. The collar bushing 17 provides addition lateral support and wear resistance to the drive shaft 21 during direction reversal at the end of each stroke, when there is a torsional force present.

The drive shaft 21 may be formed with a cylindrical section 21e forward of the front end bushing 22, and with a front end 21a adapted to be received and connected in a socket-type connection within one or more stepped internal counterbores 2b formed in a connecting rear end 2c of the external shaft 2. This embodiment includes an external shaft 2 having a cylindrical section 2d at it rear end for attachment to the front end 21a of the drive shaft 21. This embodiment reduces the notch effect and flaring of the connection between the drive shaft 21 and the external shaft 2. The connection between the shafts 21, 2 may be provided at a point internal of the tool P (i.e., rearwardly of the nose cone 6 as shown in FIG. 1), or external of the tool P (i.e., forward of the nose cone 6). In FIGS. 5A and 5B, the drive shaft 21 is shown with one stepped section (reduced diameter) 72 at its front end 21a for this socket-type connection, together with a pin hole 74 for connecting screw 1 to the external shaft 2. The drive shaft 21 of FIGS. 5A and 5B is relatively short, to make the connection to the external shaft 2 internal of the tool P. In this embodiment, the nose cone bushing 7 receives the cylindrical section 2d of the external shaft 2.

Figure 6A:
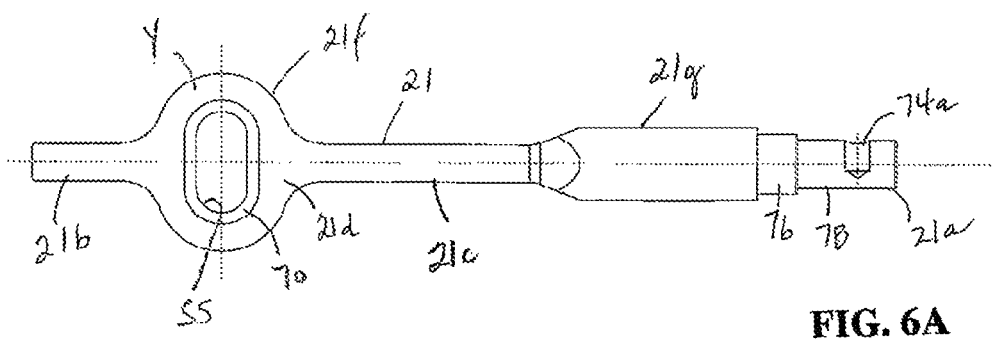
Figure 6B:
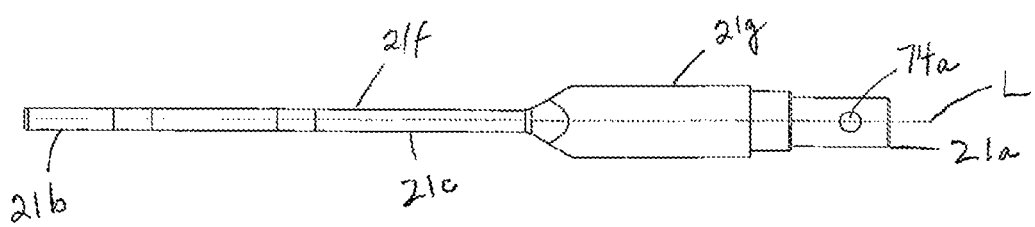
FIG. 6B is side view of the same internal drive shaft.

In FIGS. 6A and 6B, an alternate drive shaft 21f is shown, with a longer front end cylindrical portion 21g which extends through the nose cone bushing 7 and protrudes from the nose cone 6 for connection to the external shaft 2 externally of the power tool P. The drive shaft 21f is shown with two stepped sections (reduced diameters) 76, 78 at its front end 21a for a socket-type connection to the external shaft 2. The external shaft 2 is likewise formed with a two step internal counterbore 2b to accommodate these stepped sections 76, 78. A pin hole 74a is included at the front end 21a of shaft 21f for connecting with screw 1 to the external shaft 2. In this embodiment the nose cone bushing 7 receives the cylindrical section 21g of the front end of the drive shaft 21c.

In FIGS. 11A and 11B, a further embodiment of a drive shaft 21h is shown. The drive shaft 21h is similar to 21f described above, except that a transition section 21i from the rectangular mid-section 21c to the front cylindrical section 21g is more gradually tapered over a greater length. This further strengthens the drive shaft 21h at this transition section 21i for more even distribution of impact, minimizing breakage at this point under extreme loads which may be placed on the drive shaft 21h during windshield removal applications.

The drive shafts 21, 21f and 21h may be formed by casting or forging, and finished with smooth, machined surfaces formed along some of its outer surfaces. The machined surfaces may be formed at the rectangular cross section including at the rear end 21b for retaining in the rear end bushing 29, at the mid-section 21c for retaining in the front split bushing 22, in the recess 70, at the cylindrical section 21g for retaining in the nose cone bushing 7, and at the front stepped sections 72, 76, 78 for attachment to the external shaft 2. Machining these surfaces, which are loaded in the forward and rearward reciprocating movement of the drive shaft 21, 21f, 21h provides improved stability to the drive shaft along its longitudinal axis L to withstand the high side loading from all angles during windshield removal operations. Similarly, in embodiments in which the cylindrical section 2d of the external shaft 2 is held in the nose cone bushing 7, the cylindrical section 2d may be a machined or chromed surface.

In general, the longer transition section 21i from the rectangular to the cylindrical cross section of the drive shaft 21, 21f, 21h transfers the loads more evenly to the cylindrical section 21e, 21g forward of the front end bushing 22, lessening the notch effect in this transition section 21i. The machined surface on the cylindrical section 21g forms a working bearing surface which is centered on the longitudinal center axis L through the drive shaft 21h. Also centered for alignment with this longitudinal axis L of the drive shaft 21h are central longitudinal axes for the rear end bushing 29, the front end bushing 22 (as assembled), the nose cone bushing 7, and the external shaft 2. The center point of the slot SS is also on the longitudinal axis L of the drive shaft 21, for further alignment of the eccentric pin E and collar bushing 17 of the drive pin 16 with the drive shaft 21. Any significant misalignment of these components with the longitudinal axis L of the drive shaft 21 (or drive shafts 21f, 21h) allows the drive shaft to flex upwardly or downwardly or side to side within the bushings 22, 29, 7 and 17, which can lead to breakage of the drive shaft or rapid wear of the bushings.

To further assist in stabilizing the drive shaft 21 and the external shaft 2 against the high torque placed on the internal drive shaft 21 and the external shaft 2 during operations such as windshield removal, the reciprocating power tool P includes the removable nose cone 6 as best shown in FIGS. 10A-F. These Figures show a cylindrical bushing port 80 to support for the nose cone bushing 7, which in turn supports the drive shaft 21f, 21h or the external shaft 2 extending through the nose cone 6, depending on which drive shaft 21, 21f, 21h is used. The use of a cylindrical shape for the front end 21a of the drive shaft 21, 21f, 21h offers superior strength, wear resistance and stabilization of the drive mechanism D from side forces at any angle. For windshield removal, these forces can be extreme.

The nose cone 6 is formed with a nose cone housing 90 to support the nose cone bushing 7. The nose cone 6 and the nose cone bushing 7 are designed to stabilize and support the working connection end (front end 21a) of the drive shaft 21 to the external shaft 2 equally through 360° at the point of their inter-connection. A cylindrical shape for the nose cone bushing 7, and a similarly cylindrical shape for the nose cone bushing port 80 within the nose cone 6 provides this 360° symmetrical support. The bushing port 80 supports the cylindrical section 21g of the drive shaft 21f, 21h, or the cylindrical section 2d of the external shaft 2 for the embodiment with the drive shaft 21. The nose cone 6 may be formed as a separate, removable component from the lower gearbox casing 26a, as shown, to facilitate assembly of the drive mechanism D, and to assist in replacing wear parts of the tool P.

The nose cone 6 is removably attached to the lower gearbox casing 26a at five points such that the nose cone 6 forms a strong and aligned continuation of the lower gearbox casing 26a once connected, while maintaining the drive shaft 21 and its retaining and driving components and the external shaft in strict alignment along the longitudinal axis of the drive shaft and external shaft. These five connection points for the nose cone 6 provide support in all directions (i.e., 360°). A nose cone mounting boss 91 is centrally located at the bottom 6b of the nose cone housing 90 to serve as a bottom central connection point to the lower gearbox casing 26a. A side set screw 92 extends through a counterbore 93 in the boss 91, for attachment to the lower gearbox casing 26a. Two front mounting screws 4, on washers 5, extend through the nose cone housing 90 on either side of the boss 91 to further secure the nose cone 6 to the lower gearbox housing 26a. These attachment points to the lower gearbox housing provide vertical stability to the nose cone (and thus to the drive shaft and bushings).

The nose cone housing 90 includes rearwardly extending internal side attachment lugs 94 to provide lateral support to the nose cone 6, and to further attach the nose cone housing 90 to the lower gearbox housing 26a. The lugs 94 are formed with a threaded socket 95 to receive side mount securing screws (not shown) for attachment to the lower gearbox housing 26a.

The nose cone housing 90 may be formed with side access ports 96 on either side to accept shaft set screws 1 (shown in FIG. 3) extending through pin hole 74 at the front end 21a of the shorter drive shaft 21 of FIGS. 5A, 5B, for the connection between the drive shaft 21 and the external shaft 2.

The nose cone housing 90 includes an end cap 97 at the front end 6a of the nose cone 6.

The attachment points of the nose cone 6 to the housing H are located and spaced apart in a manner to provide 360° support symmetry in the loading to the nose cone bushing 7 and thus to the drive shaft 21, 21f, 21h.

The nose cone bushing 7 may be provided as an "oilite" (oil impregnated) bronze bushing for a low maintenance and permanently lubricated bushing for adverse working environments. The nose cone bushing 7 provides the support and stabilization to the cylindrical section 21e, 21g of the drive shaft 21f, 21h and/or to the cylindrical section of the external shaft 2 (depending on which component extends through the nose cone bushing 7), as the operator twists and flexes the windshield removal blade mounted to the external shaft 2 at the front end F of the tool P.

The nose cone 6 shown in FIGS. 12A-E is similar to the nose cone 6 shown in FIGS. 10A-10F, so like parts are labeled with like reference numerals. However, to further stabilize the nose cone 6 in FIGS. 12A-12E, the boss 91a is enlarged, and the side attachment lugs 94a are lengthened.

The external shaft 2 is adapted at its forward end 2a with a slot 98 and threaded ports 99 to connect to a windshield removal blade, such as the blades shown in the Ogston patents referred to above. Alternatively, the external shaft 2, or the drive shaft 21f, 21h may be adapted to connect directly, or through alternate external shafts, to another power tool attachment for applications other than windshield or glass removal.

As described above, the motor 35 may be powered by a battery 56. For a high impact tool, the battery 56 may be connected to the housing H below the handle HH in a sliding direction toward the front end of the tool P (rear entry battery). This rear entry battery attachment, coupled with locking of the battery 56 to the power tool P assists in prevent dislodging of the battery 56 during the forward high impact stroke of the tool P. As well, the battery 56 may be provided with battery contacts which are arranged so as to be driven into a more connected position as the drive shaft 21 and the external shaft 2 are reciprocated in a forward direction. Exemplary battery contacts are of the general type referred to in the industry as horseshoe contacts.

To assist the operator of the tool P, it may include a flexible boot, such as a formed rubber boot 3, which extends over the nose cone 6 and the gearbox 26a, 26b. A hand grip 82 is shown for the rubber boot (see FIG. 1) for the hand of an operator.

To power a high impact tool for windshield removal, or other applications, the motor 35, the pinion gear G and crown gear 14 may be adapted to provide a very high stroke cycle, for example between about 2800 and 3600 SPM (strokes per minute), typically about 3300 SPM.

It should be understood that, unlike most reciprocating power tools such as reciprocating saws, the drive mechanism D provided herein provides a stroke which is loaded in both directions of the stroke, i.e., both forwardly and rearwardly. Typically other reciprocating tools like saws are loaded in only one direction and free load in the other direction, and thus are only designed for a 50% payload maximum. As well, unlike most reciprocating power tools, the tool P described herein is built to withstand extreme side loads of windshield removal applications, which involve twisting movement of flat blades connected at the front end of the external shaft 2.

As used herein and in the claims, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practiced in the absence of any element or elements, limitation or limitations which is not specifically disclosed herein.

We claim:

1. A drive mechanism for a reciprocating power tool, comprising:
   a drive shaft having a front end adapted for attachment to an external shaft or to a tool attachment, a rear end, a center longitudinal axis, and forming a slot oriented perpendicular to the center longitudinal axis between the front end and the rear end;
   a motor having a driven shaft for imparting rotary movement to a pinion gear connected to the driven shaft;
   a trigger switch to operate the motor;
   a crown gear adapted to mesh with the pinion gear to impart rotary motion to the crown gear about a center axis of the crown gear; and
   a drive pin connected to the crown gear, the drive pin forming an eccentric pin which is eccentrically offset relative to the center axis of the crown gear for engagement in the slot of the drive shaft so as to impart reciprocating movement along the center longitudinal axis of the drive shaft on rotation of the crown gear, the drive pin being connected to the crown gear at two or more points centered on and straddling the center axis of the crown gear.

2. A reciprocating power tool, comprising:
   a housing having a forward end portion and a rear end portion;
   a handle at the rear end portion;
   a drive shaft mounted in the housing for reciprocating movement relative to the housing along a center longitudinal axis of the drive shaft in a forward and rearward direction, the drive shaft having a front end adapted for attachment to an external shaft or to a tool attachment, and a rear end, and forming a slot oriented perpendicular to the center longitudinal axis of the drive shaft between the front end and the rear end;
   a motor supported in the housing and having a driven shaft for imparting rotary movement to a pinion gear connected to the driven shaft;
   a trigger switch mounted on the handle to operate the motor;
   a crown gear mounted in the housing and adapted to mesh with the pinion gear for imparting rotary motion to the crown gear about a center axis of the crown gear;
   a drive pin connected to the crown gear, the drive pin forming an eccentric pin which is eccentrically offset relative to the center axis of the crown gear for engagement in the slot of the drive shaft so as to impart the reciprocating movement to the drive shaft on rotation of the crown gear, the drive pin being connected to the crown gear at two or more points centered on and straddling the center axis of the crown gear; and
   the drive shaft having a rectangular cross section between the front end and the rear end and being retained within the housing adjacent the front end by a front end bushing and adjacent the rear end by a rear end bushing.

3. The reciprocating power tool of claim 2, wherein one or more of the drive shaft, crown gear and drive pin are counterbalanced to reduce vibration caused by reciprocating movement of the drive shaft.

4. The reciprocating power tool of claim 3, further comprising:
   a counterweight formed on a first half portion of the crown gear; and
   the eccentric pin being located in a second half portion of the crown gear diametrically opposite to the counterweight.

5. The reciprocating power tool of claim 4, wherein:
   the drive pin includes a base section and two connecting pins extending from the base section, each of the two connecting pins being adapted to be received in one of two openings in the crown gear, the two openings being located on a diameter of the crown gear and being centered on the center axis of the crown gear; and
   the eccentric pin extends from the base section in a direction opposite to the two connecting pins, and is aligned with the two connecting pins on the same diameter of the crown gear.

6. The reciprocating power tool of claim 5, wherein:
   the eccentric pin includes a collar bushing adapted for rotation on the eccentric pin, the collar bushing being formed of a wear resistive material, and the collar bushing forming an outwardly extending lip at a lower end proximate the base section of drive pin;
   the slot in the drive shaft is generally oval; and
   the drive shaft forms a recess around an outer periphery of the slot adapted to receive and retain the lip of the collar bushing.

7. The reciprocating power tool of claim 6, wherein:
   the front end of the drive shaft is adapted to attach to a rear end of the external shaft;
   the front end bushing is formed as a split bushing;
   the drive shaft transitions from the rectangular cross section to a cylindrical section forward of the front end bushing;
   the front end of the drive shaft is adapted with one or more cylindrical stepped sections to be received and connected in a socket-type connection within one or more stepped counterbores formed in the rear end of the external shaft; and
   the external shaft has a cylindrical section at the rear end.

8. The reciprocating power tool of claim 7, further comprising:
   a nose cone connected to the housing through which the drive shaft or the external shaft may extend; and
   a nose cone bushing formed in the nose cone for supporting the drive shaft or the external shaft extending through the nose cone.

9. The reciprocating power tool of claim 8, wherein the nose cone is removable from the housing, and wherein the nose cone bushing has a cylindrical shape adapted to receive the cylindrical section of the drive shaft or the cylindrical section of the external shaft.

10. The reciprocating power tool of claim 9, wherein the rear end bushing, the front end bushing, the nose cone bushing, and the external shaft are all have central longitudinal axes which are centered on the longitudinal axis of the drive shaft.

11. The reciprocating power tool of claim 10, wherein the drive shaft has machined outer surfaces adapted to be held within the front end bushing, the rear end bushing and the nose cone bushing, and wherein the recess of the drive shaft is a machined surface.

12. The reciprocating power tool of claim 11, wherein the external shaft is adapted at a forward end to connect to a windshield removal blade.

13. The reciprocating power tool of claim 12, further comprising a battery adapted to drive the motor.

14. The reciprocating power tool of claim 13, wherein;
   the battery is connected to the housing below the handle in a sliding direction toward the front end of the tool;

the battery is adapted to be locked to the housing;

the battery has battery contacts which are arranged so as to be driven into a more connected position as the drive shaft and the external shaft are reciprocated in a forward direction.

15. The reciprocating power tool of claim 14, wherein the collar bushing is formed of hardened steel.

16. The reciprocating power tool of claim 14, further comprising a flexible boot adapted to fit over the nose cone and forming a hand grip.

17. The reciprocating power tool of claim 16, wherein the eccentric pin has an offset relative to the center axis of the crown gear to provide a linear reciprocating stroke length between about 5 to 15 mm.

18. The reciprocating power tool of claim 17, wherein the eccentric pin has an offset to provide a linear reciprocating stroke length of about 10 mm.

19. The reciprocating power tool of claim 17, wherein the motor, the pinion gear and crown gear are adapted to provide a stroke cycle between about 2800 and 3600 strokes per minute.

* * * * *